L. L. HAWORTH.
Seed-Drill and Planter.
No. 160,592. Patented March 9, 1875.
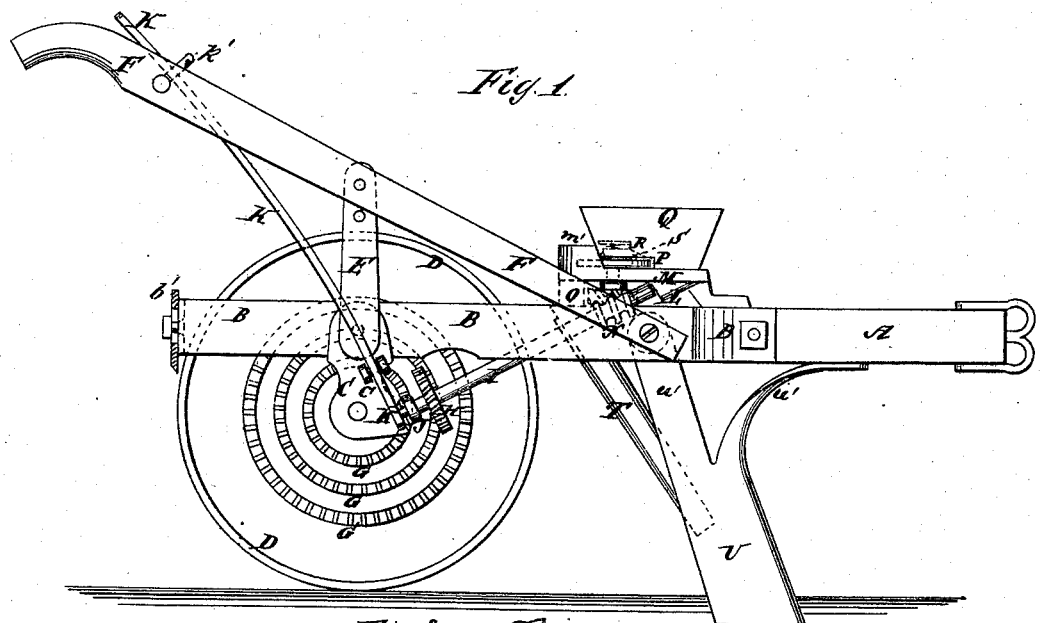
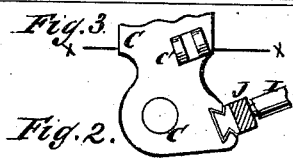
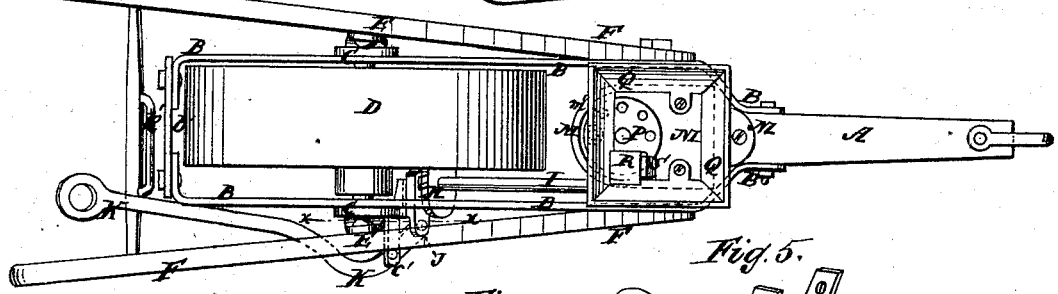
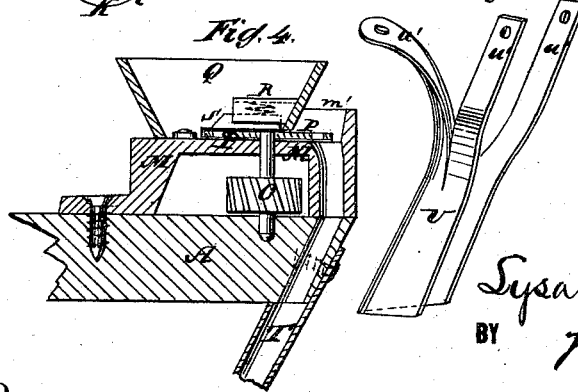
WITNESSES:
E. Wolff
A. F. Perry
INVENTOR:
Lysander L. Haworth
BY
Munn
ATTORNEYS.

UNITED STATES PATENT OFFICE.

LYSANDER L. HAWORTH, OF LONDON, OHIO.

IMPROVEMENT IN SEED DRILLS AND PLANTERS.

Specification forming part of Letters Patent No. 160,592, dated March 9, 1875; application filed January 18, 1875.

*To all whom it may concern:*

Be it known that I, LYSANDER L. HAWORTH, of London, in the county of Madison and State of Ohio, have invented a new and Improved Seed Drill and Planter, of which the following is a specification:

Figure 1 is a side view of my improved machine. Fig. 2 is a top view of the same. Fig. 3 is a detail section taken through the line $x$ $x$, Fig. 2. Fig. 4 is a detail section through the hopper and the rear part of the beam. Fig. 5 is a detail perspective view of the plow.

My invention has for its object to furnish an improved machine, simple in construction, inexpensive in manufacture, and convenient in use, and which may be used for planting seeds in drills or hills, as may be desired. The invention consists in the peculiar construction and arrangement of the frame-work, and also in the peculiar construction of a plow or opener, slitted at its upper end, and attached to the beam, as hereinafter described.

A represents the plow-beam, to the forward end of which the draft is applied, and to the opposite sides of the rear part of which are attached the forward ends of two iron bars, B. The bars B incline outward, and then extend back parallel with each other. To the parallel parts of the bars B are attached hangers C, in which are formed bearings for the journals of the wheel D. To the bars B are also secured, and with the same bolts that secure the hangers C, the lower ends of the braces E, to the upper ends of which are bolted the middle parts of the handles F. Several holes are formed in the upper parts of the brace F to receive the said bolts, so that the rear ends of the handles F may be conveniently raised and lowered to adjust them according to the height of the plowman. The forward ends of the handles F are bolted to the bars B near their forward ends. The plow-beam A and the handles F are made of wood, but all the other parts of the machine are made of iron or steel. The rear ends of the side bars B are bent inward at right angles, and to them is bolted the cross-bar $b'$, by which they are connected and held in proper position, and which serves also as a scraper to scrape off any soil that might adhere to the face of the wheel D. The scraper-bar $b'$ has transverse slots formed in its ends to receive the fastening-bolts, so that it can be lowered or raised, as desired. The wheel D is made of cast-iron, and with a wide rim to adapt it to act as a roller for covering the seed. Upon the side of the wheel D are formed three concentric rows of cogs, G, into which mesh the teeth of the small gear-wheel H, attached adjustably to the shaft I, so that it may be adjusted to gear with either of the rows or sets of cogs G, as may be desired. The rear end of the shaft I revolves in a bearing-block, J, which fits into a dovetailed groove in the forward lower part of the hanger C, and to the outer end of which is pivoted the lower end of the lever K. The lever K is pivoted to lugs $c'$, formed upon the hanger C, and its upper end projects above the round of the handles F, so that it may be conveniently reached and operated by the plowman to throw the wheel H out of and into gear with the cogs G. The lever K is held in either position by a catch, $k'$, attached to the round of the handle K. The forward end of the shaft I revolves in a bearing, L, attached to the iron plate M, which forms the bottom of the seed-hopper, and the ends of which project downward to rest upon and are bolted to the rear part of the beam A. To the shaft I, near its forward end, is attached or upon it is formed an endless screw, N, which meshes into the screw-wheel O, placed in the space between the plate M and the beam A. The journals of the screw-wheel O revolve in bearings in the beam A and in the plate M. To the end of the upper journal of the screw-wheel O, upon the upper side of the plate M, is attached the dropping-wheel P, in which, near its edge, is formed a circle of holes to remove the seed from the hopper and drop it to the ground. Q is the seed-hopper, which is made of cast-iron, and with lugs upon its lower edge to receive the bolts or screws by which it is secured to the plate M, in such a position as to cover about two-thirds of the dropping-wheel P, the remaining third projecting in the rear of said hopper Q, where it is surrounded with a flange, $m'$, formed upon the rear end of the plate M, to prevent the seed jarring out of the holes of said dropping-wheel before it has been carried to the discharge-hole leading down through the plate M and the rear end of the beam A, as shown in Fig. 4. R is the cut-off chamber, which is cast upon and in one piece with the hopper Q, and in which is placed the cut-off block S and its spring, to prevent any more seed from being carried out by and with the dropping-wheel P than what is contained in the holes of said dropping-wheel. T is a conductor-tube, the upper end of which is attached to the lower side of the rear end of the beam A, around the lower end of the discharge-hole through said beam. The lower end of the conductor-tube T is secured in the lower part of the cavity of the plow U. The plow U is made of steel bent longitudinally in V shape, as shown in Figs. 1 and 5, so that its angle may serve as a cutter for opening the soil to receive the seed. The upper part of the plow U is slit, and the strips $w'$ thus formed are bent into proper shape for attachment to the plow-beam. The strips $w'$ serve as lugs for securing the plow, and, at the same time, as braces to strengthen the plow against the draft-strain. By this peculiar plow a narrow channel is formed in the soil to receive the seed, which is dropped into the said channel through the cavity between the side parts of the plow U, and is covered by the falling in of the soil as the plow advances, the soil being pressed down upon the seed by the wheel D. For working in sod land a curved runner with a sharp forward edge is attached to the plow U, or is used instead of said plow.

Having thus described my invention, what I claim as new, and desire to secure by Letters Patent, is—

1. The frame-work of the seed drill and planter, consisting of the adjustable handles F, the braces E, the bars B B, hangers C C, attached with braces E to bars B by a common bolt, and the adjustable bar $b'$, attached to the two bars B B, so as to act both as a scraper and also as a brace to secure the loose ends of the said bars B B, all combined and arranged substantially as described.

2. The angular plow U, having its upper end divided into strips or braces, substantially as herein shown and described.

LYSANDER L. HAWORTH.

Witnesses:
 JAMES COULTAS,
 AUSTIN SLAGLE.